P. CHILIMIDOS.
CAMERA TIMING ATTACHMENT.
APPLICATION FILED APR. 15, 1922.
1,436,627.
Patented Nov. 21, 1922.
4 SHEETS—SHEET 4.
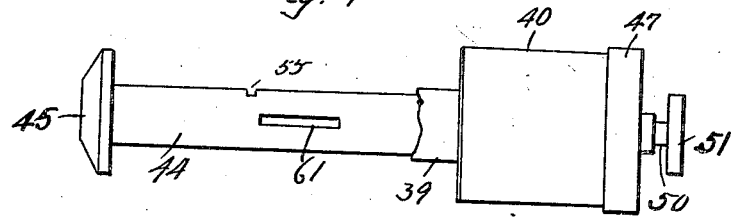
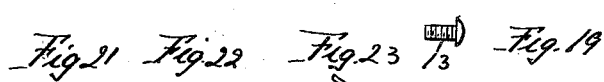
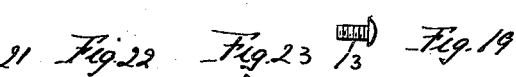
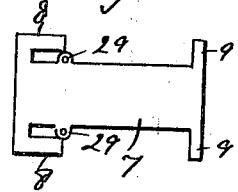
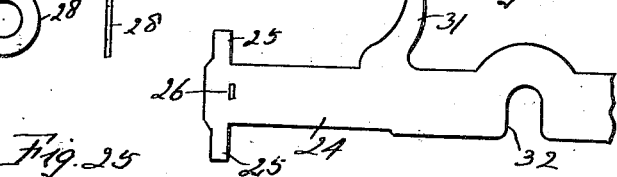
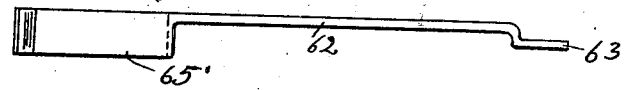
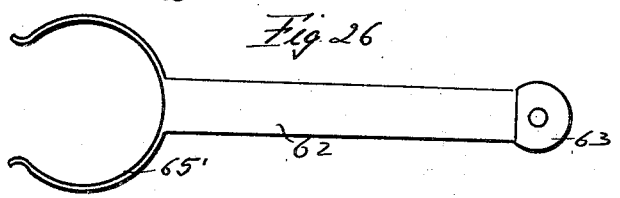
Inventor
Periclis Chilimidos
By W. W. Williamson
Atty.

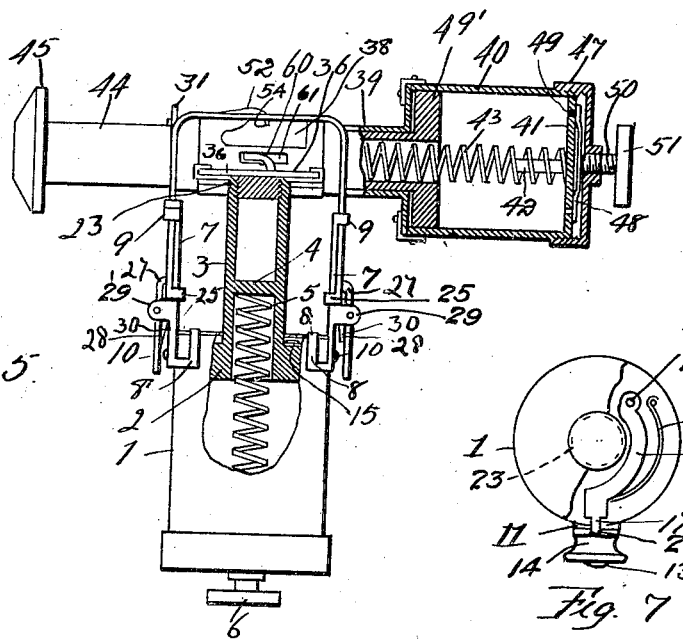

Patented Nov. 21, 1922.

1,436,627

UNITED STATES PATENT OFFICE.

PERICLIS CHILIMIDOS, OF SOUTH BETHLEHEM, PENNSYLVANIA.

CAMERA-TIMING ATTACHMENT.

Application filed April 15, 1922. Serial No. 552,856.

*To all whom it may concern:*

Be it known that I, PERICLIS CHILIMIDOS, a citizen of the United States, residing at South Bethlehem, in the county of Northampton and State of Pennsylvania, have invented new and useful Improvements in a Camera-Timing Attachment, of which the following is a specification.

My invention relates to a new and useful improvement in camera timing attachments, and has for its object to provide an exceedingly simple and effective device of this description which may be readily attached to a camera especially of the kodak type and when coupled up with a shutter tripping mechanism it will serve to time the actuation of the shutter tripping mechanism and automatically release the same enabling the operator to so time the exposure as to take a proper position to be included in the photograph.

A further object of the invention is to so construct an attachment of this description that it will not only time the actuation of the shutter tripping mechanism for time exposures but will also time the actuation of snapshots.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 5, is an enlarged view of the attachment, portions thereof being broken away and sectioned to show the interior of the timing cylinders.

Fig. 6, is a top plan view of Fig. 5, a portion of the sliding yoke broken away so as to clearly show the mechanism immediately beneath the same.

Fig. 7, is a plan view of the primary timing cylinder, a portion of the head thereof being broken away to show the latch for holding the plunger of said cylinder against the action of its spring.

Fig. 8, is a plan view of the crown plate partly broken away to clearly show the stem supporting slide.

Fig. 9, is a detail view of the secondary time cylinder, the piston and rod barrel being broken away to show the actuating slot and trigger slot in the piston rod.

Fig. 10, is an edge view of the stem supporting slide.

Fig. 11, is a plan view of Fig. 10, showing the slide in the position it assumes to release the stem.

Fig. 12, is a view similar to Fig. 10, showing the supporting slide in the position it assumes for supporting the stem.

Fig. 13, is a plan view of the trigger for releasing the plunger rod of the secondary timing cylinder.

Fig. 14, is a side elevation of Fig. 13.

Fig. 15, is a detail perspective of the spring for holding the trigger shown in Figs. 13 and 14 in its normal position.

Fig. 16, is a detail view of the hub, the shank thereof being sectioned to show the threaded hole therein.

Fig. 17, is a detail view of the release button for actuating the primary timing trigger.

Fig. 18, is an inner end view of Fig. 17.

Fig. 19, is a detail view of the screw for mounting the actuating button.

Fig. 20, is a detail view of one of the standards to which the sliding yoke is attached, showing the same before being bent.

Fig. 21, is a detail plan view of one of the latches for holding the yoke in its lowered position.

Fig. 22, is an edge view of Fig. 21.

Fig. 23, is a detail perspective of the spring for holding the latch shown in Figs. 21 and 22 in its normal position.

Fig. 24, is a detail view of a portion of the yoke prior to its being bent and formed.

Fig. 25, is an edge view of the bracket for supporting the timing attachment.

Fig. 26, is a plan view of Fig. 25.

Figure 1:
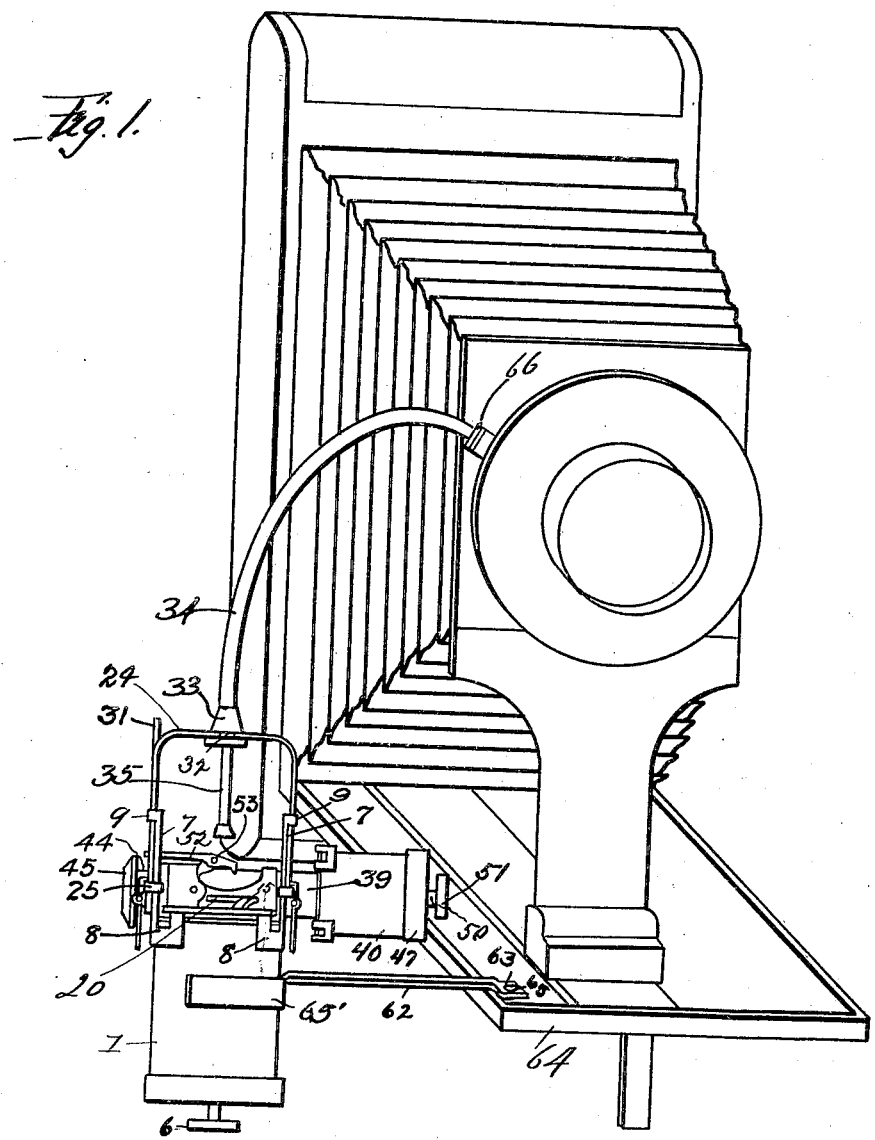
Fig. 1, is a perspective of a camera opened up for taking photographs showing my improved attachment in elevation supported upon the front of the camera casing and coupled to the outer end of the ordinary cable release of said camera.
Figure 2:
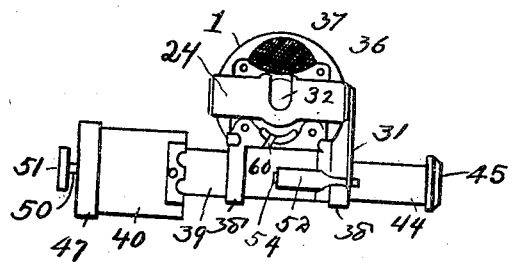
Fig. 2, is a plan view of the attachment removed from the camera.
Figure 3:
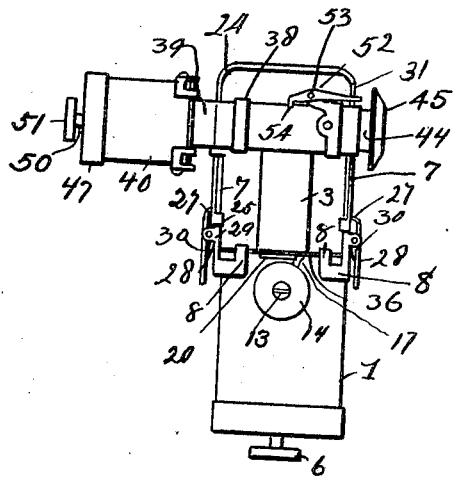
Fig. 3, is a side elevation of the attachment.
Figure 4:
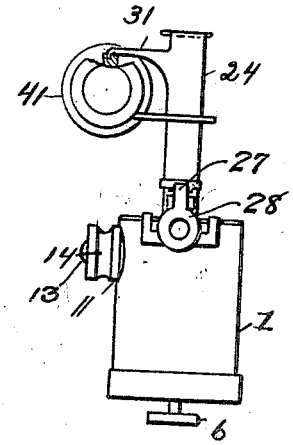
Fig. 4, is a view similar to Fig. 3 taken at right angles thereto.

In carrying out my invention as here embodied, 1 represents the primary timing cylinder in which is fitted to slide an air tight plunger 2, said plunger carrying a hollow plunger rod 3 the interior of which latter is divided by the partition 4 and within the lower portion of this hollow plunger rod is seated a spring 5 the opposite or lower end of which bears upon the bottom of the cylinder so as to move the plunger in one direction. The speed of the movement of the plunger under the influence of this spring is determined by the rate at which air is admitted to the cylinder and this is controlled and regulated by a suitable air inlet mechanism shown in Patent Number 1,344,440, issued to me June 22nd, 1920, said air inlet mechanism being operated by the thumb button 6.

7 represents two standards each of which is made from a piece of sheet metal so formed as to provide the arms 8 and the tongues 9, said arms being intended to be bent over the upper edge of the top of the cylinder 1 to place the standard in proper relative position to the cylinder and to prevent its displacement when said standards are secured to the cylinder by the screws 10. Secured to or formed with the exterior of the cylinder 1 is a hub 11 having a shank 12 projecting therefrom, the interior of which is threaded to receive the screw 13 and upon this shank is journalled a thumb button 14 held against displacement by the head of said screw but free to revolve on said shaft.

15 represents a trigger which is pivoted at 16 having a nose 17 which extends through the slot 20 in the upper portion of the cylinder 1 and is bent downward into the notch 21 formed in the inner face of the thumb button 14. Thus when the thumb button is turned in the proper direction the trigger 15 will be swung outward against the action of the spring 22 which latter normally tends to force the trigger inward into engagement with the annular groove 23 formed in the plunger rod 3, thus holding this plunger rod and the plunger carried thereby in their lowered position against the action of the spring 5.

24 represents the sliding yoke which is formed of a single piece of sheet metal having the tongues 25 projecting at right angles thereto at each end, said tongues being bent around the standards 7 in such manner that in conjunction with the tongues 9 the legs of the yoke will be guided upon said standard so as to form a free up and down movement of said yoke to prevent any sidewise or limited movement. Near each end of this yoke are formed slots 26 one of which is shown in Fig. 24 and these slots are for the reception of the noses 27 of the latches 28 which latter are pivoted between the ears 29 formed upon the standards 7 and have interposed therebetween and said standards the springs 30 for normally holding the noses of said latches in engagement with the slots 26 thereby holding the yoke in its lowered position until said latches are released. Formed with the yoke 24 is a trigger arm 31 which projects outward from the body of the yoke the purpose of which will be hereinafter explained, and in the top of the yoke is formed a U shaped slot 32 for the reception of the lower end 33 of the ordinary cable release 34 in such manner that the stem 35 of said cable release projects vertically downward centrally of the actuating cylinder 1.

Upon the top of the plunger rod 3 is mounted a crown plate 36 having a roughened section 37 to facilitate the forcing of the plunger rod and its plunger downward by the application of the thumb to said roughened section and this crown plate has secured thereto the clamp 38, said clamp surrounding and firmly holding a piston rod casing 39 said casing having attached to one end thereof the secondary timing cylinder 40. The outer head 41 of this timing cylinder has a post 42 projecting inwardly therefrom for properly placing the spring 43 which latter extends into the hollow piston rod 44 its opposite end bearing upon the cap 45 which latter has a shank 46 threaded into the outer end of said piston rod.

Upon the outer end of the secondary timing cylinder 40 is threaded a cap 47 in such manner as to form an enclosed space between the head of the cylinder and the end wall of the cap and in this space is located the regulating spring 48 one end of which is secured to the head 41 while the other end is positioned in front of the hole 49 formed through the head 41, the purpose of said hole being to admit air to the cylinder 40.

The plunger rod 44 carries a plunger 49' which is fitted to slide in the cylinder 40 and when the plunger is forced toward the outer end of this cylinder against the action of the spring 43 its movement forward will be determined by the rate at which air is admitted to the cylinder through the hole 41 and the inflowing of this air is regulated as follows:—

50 is a screw threaded through the head of the cap 47 the inner end thereof bearing upon the regulating spring 48, said screw carrying a thumb button 51 so that the turning of said button will thread the screw into or out of the head causing the spring 48 to be moved closer to or further away from the hole 41 thereby regulating the speed of the inflow of the air to said cylinder.

52 represents a trigger which is pivoted to the clamp 38 at 53 the nose of said trigger adapted to extend through the slot 54 formed in the casing 39 and into the notch 55 formed in the plunger rod 44 so that when the plunger rod is forced inward against the action of the spring 43 and the notch 55 comes into alignment with the nose and the trigger the latter will spring into said notch and hold the plunger rod and its plunger in this position until the trigger is released.

The crown plate has formed through the center thereof a circular opening 56 in alignment with the bore in the plunger rod 3 in order that the stem 35 may pass downward into said plunger rod for the purpose hereinafter set forth.

57 represents a supporting slide which is pivoted at 58 to the crown plate and this slide has a cutaway portion 59 of such shape and dimension that when the slide is swung to the position shown in Figs. 8 and 12 a portion thereof will extend within the opening 56 thus preventing the lower end of the stem 35 from passing into the plunger rod 3. This supporting slide has formed therewith a shank 60 which extends into the slot 61 formed in the plunger rod 44 in such manner that when said plunger rod is moved back and forth it will actuate said supporting slide to swing a portion thereof into or out of the circular opening 56.

For convenience in supporting the attachment upon a camera, I provide a bracket 62 having a heel 63 through which a screw 65 passes for securement of said bracket to the lid 64 of said camera to the outer end of the bracket having the spring arms 65′ for embracing the primary timing cylinder 1.

From the foregoing description the operation of my improvement will be obviously as follows:—

The cable release being attached to the shutter mechanism of the camera as indicated at 66 the opposite end being attached to the yoke as before described, the primary plunger being depressed and held against upward movement by the trigger 15, the secondary timing plunger being forced inward and held by its trigger 52 and the yoke being held in its lowered position by the latches 28, the supporting slides being within the opening 56, the actuation of the thumb button 14 to release the trigger 22 will permit the plunger 2 to be forced upward by its spring. This upward movement of this plunger carrying with it the crown plate will cause the supporting slide to contact with the lower end of the stem and force the latter upward, thus actuating the shutter mechanism through the cable in the same manner that the same is usually actuated by hand which will open the shutter for the exposure of the plate or film.

As the secondary timing cylinder and the parts connected therewith are supported by the crown plate the upward movement of said crown plate will ultimately bring the heel end of the trigger 52 into contact with the trigger arm 31 withdrawing the nose of said trigger from the slot 55 thereby releasing the plunger rod of the secondary timing cylinder and permitting the plunger of said cylinder to be forced outward by its spring 43. This outward movement of this plunger carrying with it the plunger rod 44 will gradually withdraw the projecting portion of the supporting slide 52 from without the opening 56 and when this has been accomplished the stem 35 will be free to drop through said opening into the bore of the plunger rod 3 and this reverse motion of the stem will again actuate the shutter mechanism to close the shutter and terminate the exposure.

Thus it will be seen that a person may focus the camera upon a group in which he is to be included and by setting the attachment have sufficient time to reach said group and pose therein, while the primary plunger is moved upward and after the secondary timing plunger and the mechanism carried thereby determine the length of the exposure as above stated.

When a snapshot is desired the thumb button 51 is so turned as to permit the free inrushing of air to the secondary timing cylinder so that when the plunger of the latter is freed by the tripping of the trigger 52, said plunger will shoot forward at a high rate of speed releasing the stem as before described and permitting the reverse motion thereof.

Of course I do not wish to be limited to the exact details of construction as herein shown as these may be varied within the limits of the appended claims without departing from the spirit of my invention.

Having thus fully described my invention, what I claim as new and useful is:—

1. In a timing attachment for cameras, a primary timing cylinder, a plunger fitted to slide in said cylinder, a hollow plunger rod carried by said plunger, a spring for actuating the plunger in one direction, means for regulating the speed at which said plunger moves under the influence of said spring, a secondary timing cylinder carried by said plunger rod, a plunger fitted to slide in the secondary timing cylinder, a plunger rod carried by the last named plunger, a spring for actuating the last named plunger in one direction, and means for regulating the speed of travel of said last named plunger.

2. In a device of the character described, a primary timing mechanism comprising a cylinder, a plunger adapted to slide therein, a hollow plunger rod carried by said plunger, a spring for actuating the plunger rod in one direction, means for manually operating the plunger rod in the reverse direction, a trigger for holding the plunger and rod against the action of its spring, and a secondary timing mechanism comprising a cylinder, a plunger fitted to slide therein, a plunger rod carried by said plunger, a spring adapted to move the plunger rod in one direction, means for manually moving said plunger rod in a reverse direction, a trigger for holding the plunger rod against the action of the spring, and a supporting slide adapted to be actuated by the movement of the last named rod to release the stem of an ordinary cable release.

3. In combination with a primary timing mechanism for a camera, a secondary timing mechanism mounted upon the first named mechanism, said secondary mechanism comprising a cylinder, a spring actuated plunger, a plunger rod carried by said plunger, a trigger for holding said rod in its set position, means under the control of the plunger rod for supporting and releasing the stem of a cable release, and means for tripping said trigger at a predetermined time by the functioning of the primary timing mechanism.

4. In combination with a primary timing mechanism for a camera, a secondary timing mechanism mounted upon the first named mechanism, said secondary timing mechanism comprising a cylinder, a plunger fitted to slide therein, a hollow plunger rod carried by said plunger, a spring projecting into said rod and bearing against the outer head of said cylinder for moving the plunger and its rod in one direction, a trigger adapted to engage a slot in said plunger rod for holding the plunger rod against the action of the spring, means under the control of the plunger rod for supporting and releasing the stem of the ordinary cable release, and means for releasing said trigger at a predetermined time by the functioning of the primary mechanism.

5. In combination with a primary timing mechanism for a camera consisting of a cylinder and a spring actuated plunger and plunger rod, a crown plate carried by said plunger rod, said crown plate having a central opening therein registering with the hollow interior of the plunger rod, a casing secured to said crown plate, a secondary timing cylinder secured to said casing, a plunger fitted to slide in said secondary timing cylinder, a plunger rod carried by said plunger and projecting through said casing, a spring for actuating the last named plunger and rod in one direction, a trigger mounted upon said casing the nose of which is adapted to engage with a notch formed in the plunger rod, a supporting slide pivoted to the crown plate and adapted to be so turned as to project within the central opening within said crown plate, the shank of said supporting slide projecting into a slot formed in the plunger rod, a sliding yoke, means for holding said sliding yoke in its lowered position, and a trigger arm for releasing said trigger at a predetermined time whereby the plunger rod may be forced outward by its spring to withdraw the supporting slide from the central opening to release the stem of an ordinary cable release.

6. In a secondary timing mechanism of the character described, a timing cylinder, a plunger fitted to slide therein, a hollow plunger rod carried by said plunger, a trigger adapted to hold said plunger rod against the action of said spring, means for automatically releasing said trigger at a predetermined time to permit the spring to actuate said plunger and rod in one direction, means dependent upon the movement of said plunger rod for bringing about the actuation of the stem of an ordinary cable release, and means for regulating the speed of travel of said plunger rod under the influence of the spring.

7. In a secondary timing mechanism of the character described, a timing cylinder, a plunger fitted to slide therein, a hollow plunger rod carried by said plunger, a trigger adapted to hold said plunger rod against the action of said spring, means for automatically releasing said trigger at a predetermined time to permit the spring to actuate said plunger and rod in one direction, means dependent upon the movement of said plunger rod for bringing about the actuation of the stem of an ordinary cable release, means for regulating the speed of travel of said plunger rod under the influence of the spring, and a sliding yoke adapted to receive the outer end of said cable release, and means for locking the yoke during the functioning of the timing mechanism.

8. A secondary timing mechanism for a camera comprising a cylinder, a spring actuated plunger adapted to slide therein, a plunger rod carried by said plunger, a casing carried by the cylinder through which said plunger rod extends, means for actuating the stem of a cable release in one direction, and means dependent upon the movement of the plunger rod for permitting the actuation of said stem in the reverse direction.

9. A secondary timing mechanism for a camera comprising a cylinder, a spring actuated plunger adapted to slide therein, a plunger rod carried by said plunger, a casing carried by the cylinder through which said plunger rod extends, means for actuating the stem of a cable release in one direction, means dependent upon the movement of the plunger rod for permitting the actuation of said stem in the reverse direction, a trigger for holding said plunger rod in its retracted position, means for releasing said trigger at a predetermined time, and means for determining the speed at which said plunger rod moves under the influence of its spring.

10. In a device of the character described, a primary timing mechanism adapted to actuate the stem of an ordinary cable release in one direction; a secondary timing mechanism carried by the first named timing mechanism, said secondary timing mechanism comprising a cylinder, a spring actuated plunger fitted to slide within said cylinder, and means actuated by the movement of said plunger for permitting the stem to be moved in a reverse direction.

In testimony whereof, I have hereunto affixed my signature.

PERICLIS CHILIMIDOS.